United States Patent
Hafner et al.

(10) Patent No.: US 10,995,621 B2
(45) Date of Patent: May 4, 2021

(54) TURBINE AIRFOIL WITH MULTIPLE WALLS AND INTERNAL THERMAL BARRIER COATING

(71) Applicant: General Electric Company, Schenectady, NY (US)

(72) Inventors: Matthew Troy Hafner, Honea Path, SC (US); Gary Michael Itzel, Simpsonville, SC (US); Srikanth Chandrudu Kottilingam, Greenville, SC (US)

(73) Assignee: General Electric Company, Schenectady, NY (US)

( * ) Notice: Subject to any disclaimer, the term of this patent is extended or adjusted under 35 U.S.C. 154(b) by 156 days.

(21) Appl. No.: 16/182,113

(22) Filed: Nov. 6, 2018

(65) Prior Publication Data
US 2020/0141246 A1    May 7, 2020

(51) Int. Cl.
*F01D 5/18* (2006.01)
*F01D 5/14* (2006.01)
(Continued)

(52) U.S. Cl.
CPC ............. *F01D 5/186* (2013.01); *B23P 15/04* (2013.01); *F01D 5/147* (2013.01); *F01D 5/188* (2013.01);
(Continued)

(58) Field of Classification Search
CPC .......... F01D 5/186; F01D 5/187; F01D 5/188; F01D 9/065; F01D 5/288; F05D 2260/20;
(Continued)

(56) References Cited

U.S. PATENT DOCUMENTS 3,698,834 A   10/1972 Meginnis
4,312,186 A   1/1982  Reider
(Continued)

FOREIGN PATENT DOCUMENTS

EP      3064707 A1    7/2016

OTHER PUBLICATIONS

U.S. Appl. No. 15/948,207, Non-Final Office Action dated Mar. 26, 2020, (GEEN-1013), 32 pages.
(Continued)

*Primary Examiner* — Christopher Verdier
(74) *Attorney, Agent, or Firm* — James Pemrick; Hoffman Warnick LLC

(57) ABSTRACT

An airfoil having a wall structure including a plurality of spaced walls for improved cooling and lifetime is disclosed. The airfoil and walls are made by additive manufacturing. The airfoil includes an exterior wall, an intermediate wall, and an interior wall each separated from adjacent walls by a plurality of standoff members; a plurality of outer cooling chambers defined between the exterior and intermediate walls, the chambers partitioned by an outer partition; a plurality of intermediate cooling chambers defined between the intermediate and interior walls, the chambers partitioned by an intermediate partition; a thermal barrier coating on each of the exterior wall and the intermediate wall; a first plurality of impingement openings through the intermediate wall; a second plurality of impingement openings through the interior wall; and a plurality of cooling passages through the exterior wall.

20 Claims, 8 Drawing Sheets

(51) Int. Cl.
*F01D 5/28* (2006.01)
*B23P 15/04* (2006.01)
*F01D 9/06* (2006.01)
*B33Y 80/00* (2015.01)
*B33Y 10/00* (2015.01)

(52) U.S. Cl.
CPC ............ *F01D 5/288* (2013.01); *F01D 9/065* (2013.01); *B33Y 10/00* (2014.12); *B33Y 80/00* (2014.12); *F05D 2220/32* (2013.01); *F05D 2230/31* (2013.01); *F05D 2230/60* (2013.01); *F05D 2230/90* (2013.01); *F05D 2240/24* (2013.01); *F05D 2260/202* (2013.01); *F05D 2260/204* (2013.01); *Y10T 29/49337* (2015.01); *Y10T 29/49341* (2015.01)

(58) Field of Classification Search
CPC ......... F05D 2260/201; F05D 2260/202; F05D 2260/204; F05D 2260/205; F05D 2230/90; F05D 2230/31; F05D 2230/311; F05D 2230/312; F05D 2230/313; F05D 2230/314; B23P 15/04; Y10T 29/49337; Y10T 29/49341; Y10T 29/49343; B33Y 10/00; B33Y 80/00
See application file for complete search history.

(56) References Cited

U.S. PATENT DOCUMENTS

| | | | |
|---|---|---|---|
| 7,670,675 | B2 | 3/2010 | Heselhaus |
| 8,608,430 | B1 | 12/2013 | Liang |
| 9,422,828 | B2 | 8/2016 | Morrison et al. |
| 9,683,444 | B1 | 6/2017 | Jones |
| 10,774,656 | B2 | 9/2020 | Itzel et al. |
| 2009/0074576 | A1 | 3/2009 | Brostmeyer |
| 2014/0102684 | A1 | 4/2014 | Sezer et al. |
| 2016/0160760 | A1 | 6/2016 | Romanov et al. |
| 2017/0328212 | A1 | 11/2017 | Bunker |
| 2018/0163545 | A1* | 6/2018 | Bang ................ F23R 3/002 |
| 2018/0347370 | A1* | 12/2018 | Lacy ................ F01D 9/065 |
| 2018/0347442 | A1* | 12/2018 | Lacy ................ B33Y 80/00 |
| 2019/0309634 | A1* | 10/2019 | Itzel ................ F01D 5/288 |

OTHER PUBLICATIONS

Magerramova, Liubov & Vasilyev, Boris & Kinzburskiy, Vladimir. (2016). Novel Designs of Turbine Blades for Additive Manufacturing. V05CT18A001. 10.1115/GT2016-56084. Jun. 13-17, 2016.

U.S. Appl. No. 15/948,207, Notice of Allowance dated Jul. 29, 2020, (GEEN-1013), 10 pages.

* cited by examiner

TURBINE AIRFOIL WITH MULTIPLE WALLS AND INTERNAL THERMAL BARRIER COATING

BACKGROUND

Technical Field

The disclosure relates generally to cooling of components, and more particularly, to a hot gas path component with multiple walls and thermal barrier coatings that is made by additive manufacturing and includes an internal thermal barrier coating (TBC) layer.

Related Art

Hot gas path components that are exposed to a working fluid at high temperatures are used widely in industrial machines. For example, a gas turbine system includes a turbine with a number of stages with blades extending outwardly from a supporting rotor disk. Each blade includes an airfoil exposed to the flow of hot combustion gases. The airfoil must be cooled to withstand the high temperatures produced by the combustion gases. Insufficient cooling may result in undue stress and oxidation on the airfoil and may lead to fatigue and/or damage. The airfoil thus is generally hollow with one or more internal cooling flow circuits leading to a number of cooling holes and the like. Cooling air is discharged through the cooling holes to provide film cooling to the outer surface of the airfoil. Other types of hot gas path components and other types of turbine components may be cooled in a similar fashion.

Although many models and simulations may be performed before a given component is put into operation in the field, the exact temperatures to which a component or any area thereof may reach vary greatly due to component-specific hot and cold locations. Specifically, the component may have temperature-dependent properties that may be adversely affected by overheating. As a result, many hot gas path components may be overcooled to compensate for localized hot spots that may develop on the components. Such excessive overcooling, however, may have a negative impact on overall industrial machine output and efficiency.

Despite the presence of cooling passages many components also rely on a thermal barrier coating (TBC) applied to an outer surface thereof to protect the component. If a break, crack, or loss referred to as a spall, occurs in a TBC of a hot gas path component, the local temperature of the component at the spall may rise to a harmful temperature. For example, the spall may expose the exterior wall of the hot gas path component to the high temperature fluid causing the exterior surface to oxidize, shortening the lifetime of the hot gas path component. One approach to a TBC spall provides a plug in a cooling hole under the TBC. When a spall occurs, the plug is removed, typically through exposure to heat sufficient to melt the plug, the cooling hole opens and a cooling medium can flow from an internal cooling circuit fluidly coupled to the cooling hole. The plug may be porous to assist in its removal. This process reduces overcooling. Formation of the plug however is complex, requiring precise machining and/or precise thermal or chemical processing of materials to create the plug.

SUMMARY

A first aspect of the disclosure provides a turbine airfoil, the airfoil having a wall structure including: a plurality of spaced walls including an exterior wall, an intermediate wall, and an interior wall, wherein each of the plurality of spaced walls are separated from an adjacent spaced wall by a plurality of standoff members; a plurality of outer cooling chambers defined between the exterior wall and the intermediate wall; an outer partition between the exterior wall and the intermediate wall that axially separates each of the plurality of outer cooling chambers from one another; a plurality of intermediate cooling chambers defined between the intermediate wall and the interior wall; an intermediate partition between the intermediate wall and the interior wall that axially separates each of the plurality of intermediate cooling chambers from one another; a first thermal barrier coating (TBC) disposed on an exterior face of the exterior wall, the first TBC having an exterior surface configured to be exposed to a working fluid having a high temperature; a second TBC disposed on an outer face of the intermediate wall, the second TBC having an outer surface configured to be exposed to the working fluid having the high temperature, wherein an outer surface of each standoff member in the plurality of standoff members is free from the second TBC, and wherein an outer surface of the outer partition is free from the second TBC; a first plurality of impingement openings through the interior wall, the first plurality of impingement openings providing passageways for a coolant from a central chamber of the turbine airfoil to at least one of the plurality of intermediate cooling chambers; a second plurality of impingement openings through the intermediate wall, the second plurality of impingement openings providing passageways for the coolant from at least one of the plurality of intermediate cooling chambers to at least one of the plurality of outer cooling chambers; and a plurality of cooling passages through the exterior wall, the plurality of cooling passages providing passageways for the coolant from at least one of the plurality of outer cooling chambers to the exterior surface of the first TBC.

A second aspect of the disclosure provides a hot gas path (HGP) component, the HGP component having a wall structure including: a plurality of spaced walls including an exterior wall, an intermediate wall, and an interior wall, wherein each of the plurality of spaced walls are separated from an adjacent spaced wall by a plurality of standoff members; a plurality of outer cooling chambers defined between the exterior wall and the intermediate wall; an outer partition between the exterior wall and the intermediate wall that axially separates each of the plurality of outer cooling chambers from one another; a plurality of intermediate cooling chambers defined between the intermediate wall and the interior wall; an intermediate partition between the intermediate wall and the interior wall that axially separates each of the plurality of intermediate cooling chambers from one another; a first thermal barrier coating (TBC) disposed on an exterior face of the exterior wall, the first TBC having an exterior surface configured to be exposed to a working fluid having a high temperature; a second TBC disposed on an outer face of the intermediate wall, the second TBC having an outer surface configured to be exposed to the working fluid having the high temperature, wherein an outer surface of each standoff member in the plurality of standoff members is free from the second TBC, and wherein an outer surface of the outer partition is free from the second TBC; a first plurality of impingement openings through the interior wall, the first plurality of impingement openings providing passageways for a coolant from a central chamber of the turbine airfoil to at least one of the plurality of intermediate cooling chambers; a second plurality of impingement openings through the intermediate wall, the second plurality of impingement openings providing passageways for the coolant from at least one of the plurality of intermediate cooling chambers to at least one of the plurality of outer cooling chambers; a plurality of plateaus disposed on the exterior face of the exterior wall, wherein an outer surface of each plateau in the plurality of plateaus is free from the first TBC; and a plurality of cooling passages through the exterior wall, each cooling passage in the plurality of cooling passages disposed to pass through one plateau of the plurality of plateaus, and wherein the plurality of cooling passages provides passageways for the coolant from at least one of the plurality of outer cooling chambers to the exterior surface of the first TBC.

A third aspect of the disclosure provides a method of manufacturing a turbine airfoil, including: additively manufacturing a turbine airfoil skin, the turbine airfoil skin including: an exterior wall; and a plurality of cooling passages through the exterior wall; applying a first thermal barrier coating (TBC) on an exterior face of the external wall of the turbine airfoil skin, the first TBC having an exterior surface configured to be exposed to a working fluid having a high temperature; additively manufacturing a turbine airfoil core, the turbine airfoil core including: a plurality of spaced walls including an interior wall including a first plurality of impingement openings through the interior wall, and an intermediate wall having a second plurality of impingement openings through the interior wall, wherein each of the plurality of spaced walls are separated from an adjacent spaced wall by a first plurality of standoff members; a plurality of intermediate cooling chambers defined between the interior wall and the intermediate wall; an intermediate partition between the intermediate wall and the interior wall axially separating each of the plurality of intermediate cooling chambers from one another; a second plurality of standoff members positioned on an outermost face of the turbine airfoil core; and an outer partition positioned on the outermost face of the turbine airfoil core; applying a second TBC on the outermost face of the turbine airfoil core, the second TBC having an outer surface configured to be exposed to the working fluid having the high temperature, wherein an outer surface of each standoff member in the second plurality of standoff members is free from the second TBC and wherein an outer surface of the outer partition is free from the second TBC; and assembling the turbine airfoil skin and the turbine airfoil core to form a turbine airfoil wall structure such that the turbine airfoil core is surrounded by the turbine airfoil skin, wherein: the turbine airfoil skin is separated from the turbine airfoil core by the second plurality of standoff members, a plurality of outer cooling chambers is defined between the turbine airfoil skin and the turbine airfoil core, the outer partition axially separating each of the plurality of outer cooling chambers from one another; the plurality of cooling passages provides passageways for the coolant from at least one of the plurality of outer cooling chambers to the exterior surface of the first TBC; the first plurality of impingement openings provides passageways for a coolant from a central chamber of the turbine airfoil to at least one of the plurality of intermediate cooling chambers; and the second plurality of impingement openings provides passageways for the coolant from at least one of the plurality of intermediate cooling chambers to at least one of the plurality of outer cooling chambers.

The illustrative aspects of the present disclosure are designed to solve the problems herein described and/or other problems not discussed.

BRIEF DESCRIPTION OF THE DRAWINGS

These and other features of this disclosure will be more readily understood from the following detailed description of the various aspects of the disclosure taken in conjunction with the accompanying drawings that depict various embodiments of the disclosure, in which.

It is noted that the drawings of the disclosure are not to scale. The drawings are intended to depict only typical aspects of the disclosure, and therefore should not be considered as limiting the scope of the disclosure. In the drawings, like numbering represents like elements between the drawings.

DETAILED DESCRIPTION

Figure 1:
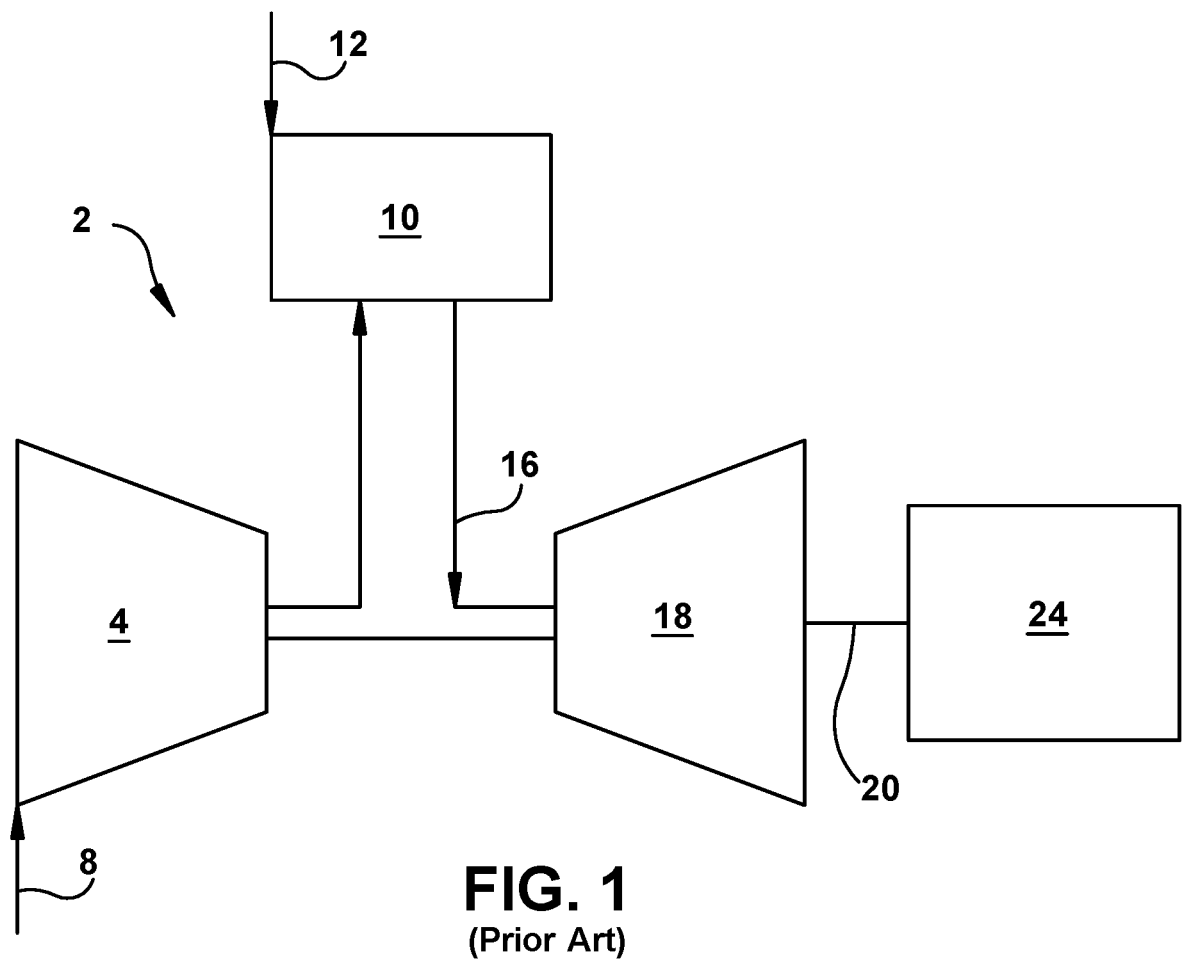
FIG. 1 is a schematic diagram of an illustrative industrial machine having a hot gas path component in the form of a gas turbine system.

As an initial matter, in order to clearly describe the current disclosure it will become necessary to select certain terminology when referring to and describing relevant machine components within an industrial machine such as a gas turbine system. When doing this, if possible, common industry terminology will be used and employed in a manner consistent with its accepted meaning. Unless otherwise stated, such terminology should be given a broad interpretation consistent with the context of the present application and the scope of the appended claims. Those of ordinary skill in the art will appreciate that often a particular component may be referred to using several different or overlapping terms. What may be described herein as being a single part may include and be referenced in another context as consisting of multiple components. Alternatively, what may be described herein as including multiple components may be referred to elsewhere as a single part.

In addition, several descriptive terms may be used regularly herein, and it should prove helpful to define these terms at the onset of this section. These terms and their definitions, unless stated otherwise, are as follows. The term "radial" refers to movement or position perpendicular to an axis. In cases such as this, if a first component resides closer to the axis than a second component, it will be stated herein that the first component is "radially inward" or "inboard" of the second component. If, on the other hand, the first component resides further from the axis than the second component, it may be stated herein that the first component is "radially outward" or "outboard" of the second component. It will be appreciated that such terms may be applied in relation to the center axis of the turbine. The term "outer" or "exterior" refers to the direction towards the surface of the component which is exposed to the working fluid at high temperatures. The term "inner" or "interior" refers to the direction away from the surface of the component which is exposed to the working fluid at high temperature.

As indicated above, the disclosure provides a hot gas path (HGP) component in the form of a turbine airfoil having multiple walls. The turbine airfoil or individual walls and the structures thereof may be formed by additive manufacturing. The walls of the turbine airfoil may be spaced to form chambers therebetween. The chambers may each be axially partitioned into multiple cooling chambers by partitions extending between the walls. The exterior wall of the turbine airfoil may include multiple cooling passages allowing for a cooling fluid flow from at least one of the cooling chambers to an external surface of the turbine airfoil. The exterior wall and some or all of the other walls may also include a thermal barrier coating (TBC) on the outer surface thereof. The walls of the airfoil other than the exterior wall may each include multiple impingement openings to allow cooling fluids to flow between a central chamber of the turbine airfoil and at least one of the cooling chambers.

When a spall in a thermal barrier coating (TBC) exposes the exterior wall of a multiwall airfoil to a high temperature environment, the structure of the walls allow a cooling fluid flow to pass from the central chamber of the turbine airfoil through the cooling chambers to an interior face of the exterior wall to slow down the oxidation of the exposed exterior wall. After oxidation through the exterior wall exposes at least one of the other walls of the airfoil to the high-temperature environment, the cooling chambers and impingement openings may allow the cooling fluid flow to form a slot film over the opening in the exposed exterior wall. A second TBC on the outer face of the exposed other wall can prevent or slow erosion of the other wall where oxidation has formed openings through the exterior wall. Before spalls are formed, the cooling chambers and impingement openings allow the cooling fluid flow to contact the interior face of the exterior wall to cool the wall. The turbine airfoil walls and the structures thereof as discussed herein may increase the lifetime of the airfoil in a situation wherein a spall is formed in the TBC.

Referring now to the drawings, in which like numerals refer to like elements throughout the several views, FIG. 1 shows a schematic view of an illustrative industrial machine in the form of a gas turbine system 2. While the disclosure will be described relative to gas turbine system 2, it is emphasized that the teachings of the disclosure are applicable to any industrial machine having a hot gas path component requiring cooling. Gas turbine system 2 may include a compressor 4. Compressor 4 compresses an incoming flow of air 8, and delivers the compressed flow of air 8 to a combustor 10. Combustor 10 mixes the compressed flow of air 8 with a pressurized flow of fuel 12 and ignites the mixture to create a flow of combustion gases 16. Although only a single combustor 10 is shown, gas turbine system 2 may include any number of combustors 10. Flow of combustion gases 16 is in turn delivered to a turbine 18. Flow of combustion gases 16 drives turbine 18 so as to produce mechanical work. The mechanical work produced in turbine 18 drives compressor 4 via a shaft 20 and an external load 24 such as an electrical generator and the like.

Gas turbine system 2 may use natural gas, liquid fuels, various types of syngas, and/or other types of fuels and blends thereof. Gas turbine system 2 may be, for example, any one of a number of different gas turbine engines offered by General Electric Company of Schenectady, N.Y. Gas turbine system 2 may have different configurations and may use other types of components. Teachings of the disclosure may be applicable to other types of gas turbine systems and or industrial machines using a hot gas path. Multiple gas turbine systems, or types of turbines, and or types of power generation equipment also may be used herein together.

Figure 2:
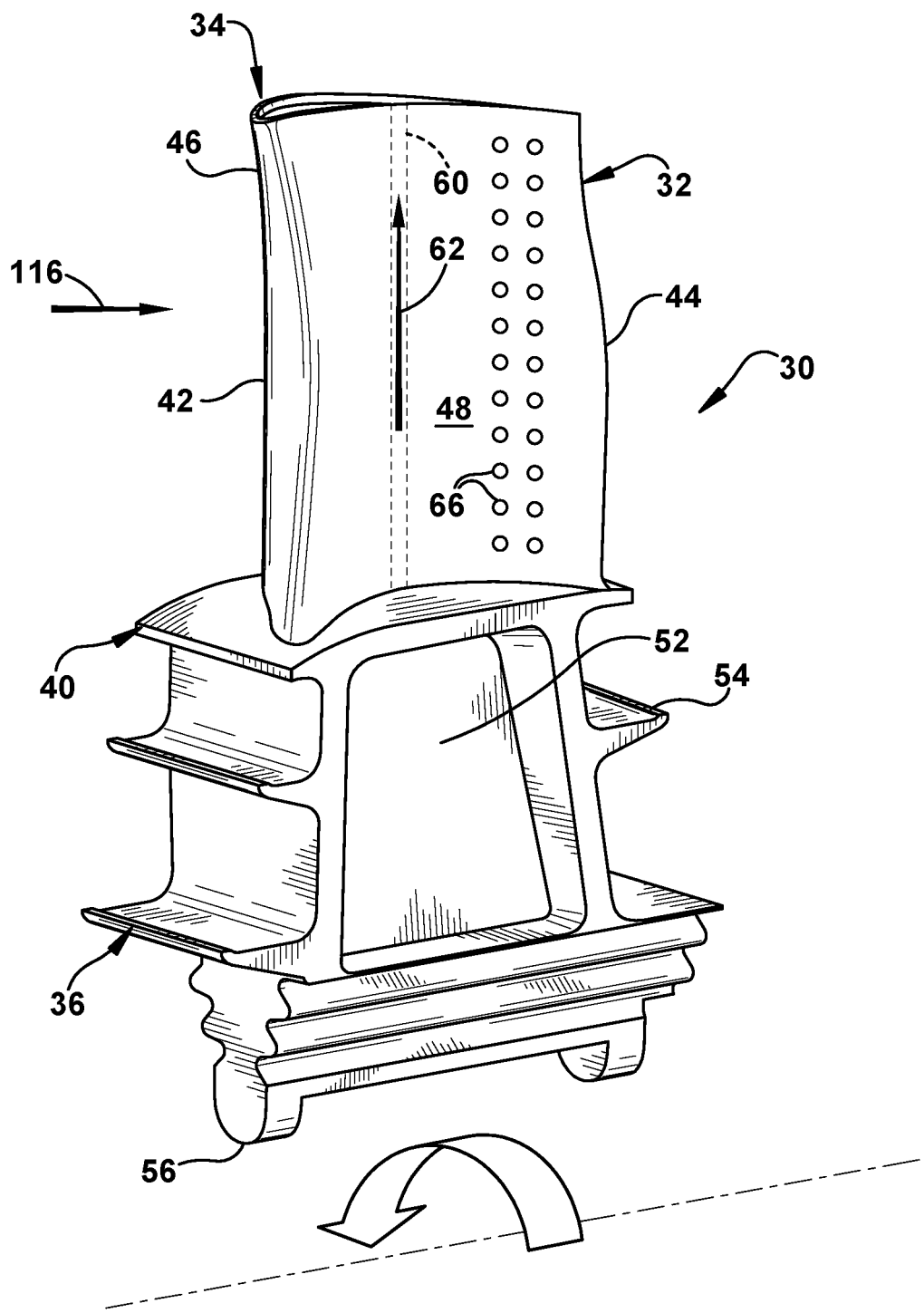
FIG. 2 is a perspective view of a known hot gas path component in the form of a turbine airfoil.

FIG. 2 shows an example a hot gas path (HGP) component 30 having a turbine airfoil 32 that may be used in the hot gas path (HGP) of turbine 18 (FIG. 1) and the like. While the disclosure will be described relative to turbine airfoil 32 and more specifically a wall structure 34 thereof, it is emphasized that the teachings of the disclosure are applicable to any hot gas path (HGP) component requiring cooling. Generally described, HGP component 30 may include airfoil 32, a shank portion 36, and a platform 40 disposed between airfoil 32 and shank portion 36. Airfoil 32 generally extends radially outward from platform 40 and includes a leading edge 42 and a trailing edge 44. Airfoil 32 also may include a concave surface defining a pressure side 48 and an opposite convex surface defining a suction side 46. Platform 40 may be generally horizontal and planar. Shank portion 36 may extend radially downward from platform 40 such that platform 40 generally defines an interface between airfoil 32 and shank portion 36. Shank portion 36 may include a shank cavity 52. Shank portion 36 also may include one or more angel wings 54 and a root structure 56 such as a dovetail and the like. Root structure 56 may be configured to secure, with other structure HGP component 30 to shaft 20 (FIG. 1). Any number of HGP components 30 may be circumferentially arranged about shaft 20 (FIG. 1). Other components and or configurations also may be used herein.

Turbine airfoil 32 may include one or more cooling circuits 60 extending therethrough for flowing a cooling medium 62 such as air from compressor 4 (FIG. 1) or from another source. Steam and other types of cooling mediums 62 also may be used herein. Cooling circuits 60 and cooling medium 62 may circulate at least through portions of airfoil 32, shank portion 36, and platform 40 in any order, direction, or route. Many different types of cooling circuits and cooling mediums may be used herein in any orientation. Cooling circuits 60 may lead to a number of cooling passageways 66 or other types of cooling pathways for film cooling about airfoil 32 or elsewhere. Other types of cooling methods may be used. Other components and or configurations also may be used herein.

Figure 3:
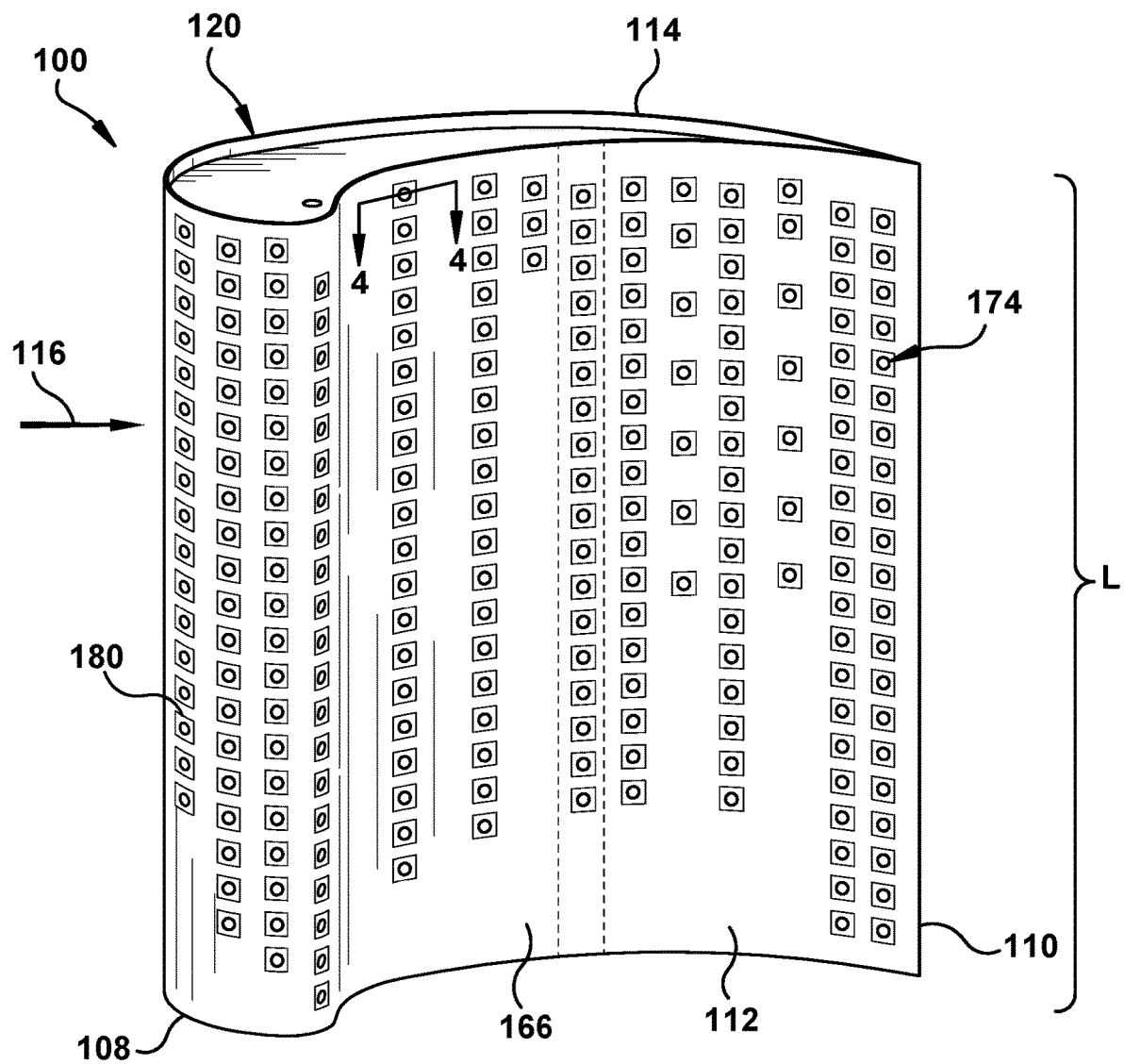
FIG. 3 is a perspective view of a hot gas path component in the form of a turbine airfoil, according to embodiments of the disclosure.
Figure 4:
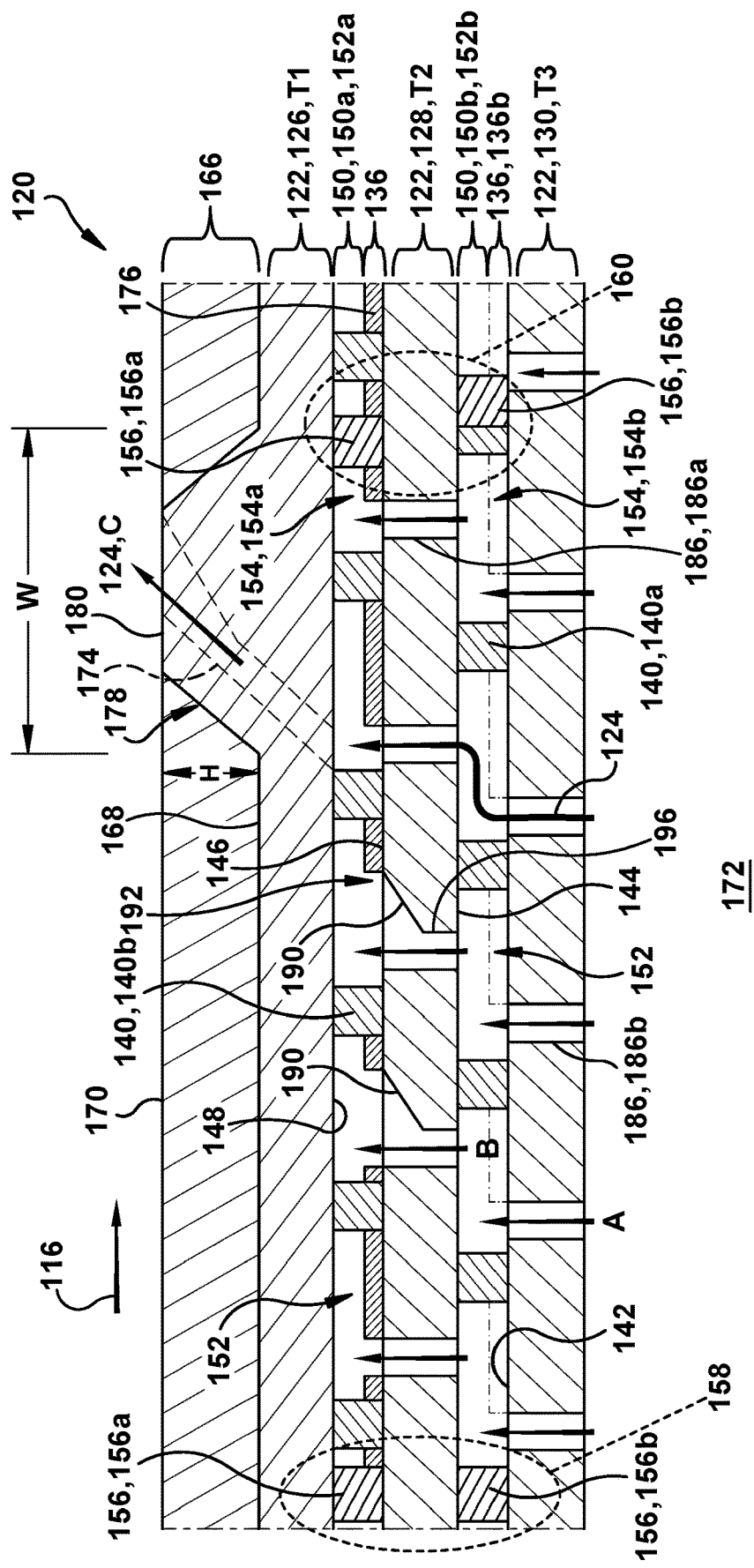
FIG. 4 is a cross-sectional view of a portion of the wall structure of the turbine airfoil with multiple walls, according to embodiments of the disclosure.

FIG. 3 and FIG. 4 show an example of a HGP component in the form of a turbine airfoil 100 (hereinafter airfoil 100) as may be described herein. FIG. 3 is a perspective view of airfoil 100, and FIG. 4 is a cross-sectional view of a portion of a wall structure 120 of airfoil 100. Although a portion of airfoil 100 is shown in FIG. 4, it is understood that wall structure 120 and the structures thereof may extend along a portion of or an entirety of the perimeter of airfoil 100.

Wall structure 120 and the structures thereof as described herein are not limited to airfoil 100. As discussed above, although described herein with respect to airfoil 100, the structure of the disclosure may be a part of a blade; a vane; or any type of air-cooled component including a shank, a platform, or any type of hot gas path component. Other types of HGP components and other configurations may be used herein. The structure of the disclosure may also be applicable to nozzles (e.g., stator nozzles, nozzle sidewalls, etc.), shrouds, heat shields and/or combustion components.

Similar to that described above, airfoil 100 may include a leading edge 108 and a trailing edge 110. Likewise, airfoil 100 may include a pressure side 112 and a suction side 114. A working fluid 116 may flow along an exposed thermal barrier coating (TBC) 166 of airfoil 100 from the leading edge to the trailing edge. Working fluid 116 may have a high temperature. As used herein, "high temperature" depends on the form of industrial machine, e.g., for gas turbine system 2, high temperature may be any temperature greater than 100 degrees Celsius (° C.).

As shown in FIG. 3 and FIG. 4, airfoil 100 may include wall structure 120, according to embodiments of the disclosure. As best shown in FIG. 4, wall structure 120 includes a plurality of spaced walls 122. As will be discussed in further detail herein, the plurality of spaced walls 122 may improve the cooling of wall structure 120 and/or airfoil 100 by a cooling medium 124 flowing through airfoil 100. Wall structure 120 of airfoil 100 may include an exterior wall 126, an intermediate wall 128, and an interior wall 130. Each spaced wall 122 may have a thickness of approximately 0.02 inches to approximately 0.15 inches. Two or more spaced walls 122 may be formed to have the same and/or different thicknesses. In the example of FIG. 4, exterior wall 126 may have a thickness T1 substantially equal to a thickness T2 of intermediate wall 128 and/or thickness T3 of interior wall 130. Although three walls are shown, it is understood that wall structure 120 may include any desired number (e.g., two walls, five walls, ten walls, twenty walls, etc.) of spaced walls 122, e.g., with more than one intermediate wall 128. In embodiments with two walls, it should be understood that intermediate wall 128 and interior wall 130 (and respective features and structures of each) described in the present disclosure refer to the same wall, distinct from exterior wall 126.

Wall structure 120 may include multiple standoff members 140 separating each spaced wall 122 from an adjacent spaced wall. Each standoff member 140 may be formed of a thermally conductive material, e.g., one or more metals. Standoff members 140 may conduct heat through wall structure 120 and help to direct the flow of cooling medium 124 through wall structure 120 during operation. As shown in FIG. 4, standoff members 140a may extend from an exterior face 142 of interior wall 130 to an interior face 144 of intermediate wall 128. Standoff members 140b may extend from an exterior face 146 of intermediate wall 128 to an interior face 148 of exterior wall 126. Standoff members 140 may separate spaced walls 122 by any distance, e.g., based on the characteristics of a particular turbomachine in which airfoil 100 is employed and/or flow path where the turbomachine is employed. For example, standoff members 140 may separate each spaced wall 122 a distance equal to approximately one-half to 5 times a diameter of an impingement opening discussed later herein as being formed within one or more of the spaced walls. Forming spaced walls 122 at this distance may reduce the amount of cooling medium 124 that may become stagnant between walls 122 of wall structure 120 during operation.

Figure 5:
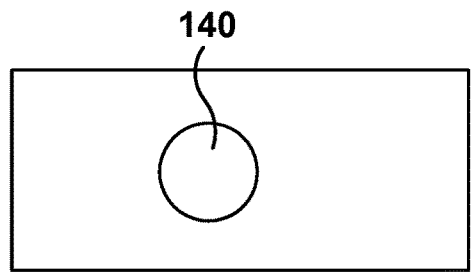
FIGS. 5-10 are cross-sectional views of various geometries of standoff members between the multiple walls of the wall structure of the turbine airfoil, according to embodiments of the disclosure.
Figure 6:
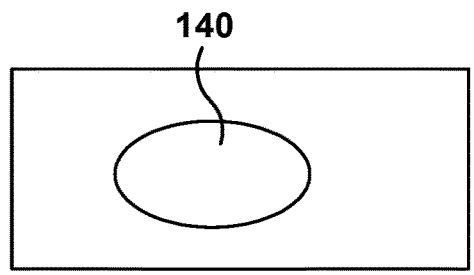
Figure 7:
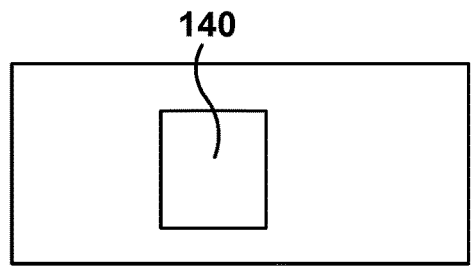
Figure 8:
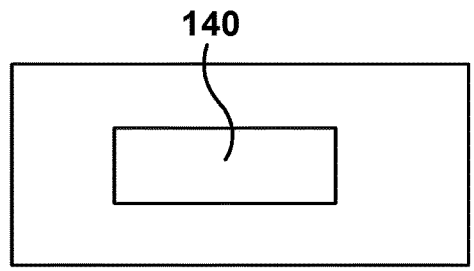
Figure 9:
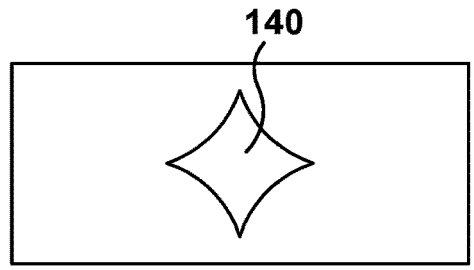
Figure 10:
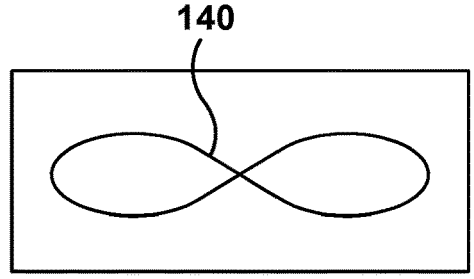

Turning briefly to FIGS. 5-10, cross-sectional views of various geometrical profiles for standoff member(s) 140 are shown. Standoff members 140 may have any desirable cross-sectional geometry for conducting heat and directing the flow of cooling medium 124 through wall structure 120 during operation. The cross-sectional geometry may also, for example, be selected based on the characteristics of a particular turbomachine in which airfoil 100 may be employed and/or flow path where the turbomachine is employed. For example, as shown in FIG. 5 and FIG. 6, standoff members 140 may have a round or oblong cross-sectional geometry. As shown in FIG. 7 and FIG. 8, standoff members 140 may have a square or rectangular cross-sectional geometry. As shown in FIG. 9, standoff members 140 may have a polygonal e.g., square, cross-sectional geometry with curved sides. As shown in FIG. 10, standoff members 140 may have a curvilinear and/or composite (i.e., racetrack or figure-eight) cross-sectional geometry. Although shown in FIGS. 5-10 to have particular geometries and orientations, it is understood that standoff members may have any desirable cross-sectional geometry and/or orientation. Additionally, standoff members may taper between walls or have other variations in cross-sectional area as desired. Although a particular layout and number of standoff members 140 is shown in FIG. 4, it is understood that any desirable number and/or layout of standoff members may be used to separate spaced walls 122 without exceeding the scope of the disclosure. Additionally, it is understood that any number of standoff members 140 may have the same and/or different cross-sectional geometry.

Returning to FIG. 3 and FIG. 4, plurality of spaced walls 122 of wall structure 120 may allow for a plurality of chambers 152 to be formed within wall structure 120 of airfoil 100. As will be discussed herein, the plurality of chambers 152 may improve the cooling of wall structure 120 and/or airfoil 100 during operation. As shown in FIG. 4, spaces 150 between spaced walls 122 may define chambers 152. For example, a first space 150a between exterior wall 126 and intermediate wall 128 may define a first chamber 152a. A second space 150b between intermediate wall 128 and interior wall 130 may define a second chamber 152b. As discussed above, any number of spaced walls 122 may be included in wall structure 120 and therefore any number of chambers 152 defined by spaces 150 therebetween may be included in wall structure 120.

Wall structure 120 may also include at least one partition 156 axially separating each chamber 152 between a set of spaced walls 122 into several cooling chambers 154. Partition(s) 156 may extend into and out of the page of FIG. 4, in contrast to standoff members 140. As will be discussed further herein, partitions 156 may prevent cooling medium 124 from re-entering and working fluid 116 from entering airfoil 100 in a situation where a spall induced opening (e.g., spall induced openings 210 of FIG. 12) is formed in exterior wall 126 of wall structure 120. As shown in FIG. 4, a first set of partitions 156a can axially separate first chamber 152a into a plurality of first cooling chambers 154a. Each partition 156 of the first set of partitions 156a may extend from exterior face 146 of intermediate wall 128 to interior face 148 of exterior wall 126. As also shown in FIG. 4, a second set of partitions 156b can axially separate second chamber 152b into a plurality of second cooling chambers 154b. Each partition 156 of the second set of partitions 156b may extend from exterior face 142 of interior wall 130 to interior face 144 of intermediate wall 128.

Each partition 156 may extend substantially along an entire radial length L (FIG. 3) of airfoil 100. For example, each partition 156 may extend into and out of the page of FIG. 4 for the entire radial length L of airfoil 100. In another non-limiting example, each partition 156 may extend along different portions of the radial length L of airfoil 100. As further shown in FIG. 4, adjacent first and second partitions 156a, 156b, e.g., first adjacent set 158 (in left phantom oval), may be substantially aligned with one another. Alternatively, adjacent first and second partitions 156a, 156b, e.g., second adjacent set 160 (in right phantom oval), may be non-aligned with one another. Although four partitions 156 are shown in the example of FIG. 4, it is understood that any desirable number of partitions may be included along pressure side 112 and/or suction side 114 of wall structure 120 of airfoil 100.

As discussed above, airfoil 100 may include TBC 166 disposed on wall structure 120 for exposure to working fluid 116. TBC 166 may protect airfoil 100 during exposure of the component to high temperature working fluid 116. For example, an exterior surface 170 of TBC 166 may be configured to endure exposure to working fluid 116. As shown in FIG. 4, TBC 166 may be disposed on an exterior face 168 of exterior wall 126 of wall structure 120 of airfoil 100. Additionally, second TBC 136 may be disposed on exterior face 146 of intermediate wall 128 as shown in FIG. 4. It should be understood that third TBC 136b (in phantom) may also be disposed on exterior face 142 of interior wall 130 in a similar manner to second TBC 136. TBC 166, second TBC 136, and third TBC 136b may have the same composition or may have different compositions from one another.

TBC 166, 136 may include any now known or later developed materials configured to protect exterior faces 168, 146, 142 of spaced walls 122 included in wall structure 120 from thermal damage (e.g., creep, thermal fatigue, cracking and/or oxidation). TBC 166, 136 may include, for example, a ceramic blanket, zirconia, yttria-stabilized zirconia, a noble metal-aluminide such as platinum aluminide, MCrAlY alloy in which M may be cobalt, nickel or cobalt-nickel alloy and Y is yttrium or another rare earth element, and/or any other now known or later developed TBC material.

TBC 166, 136 may include one or more layers of one or more material compositions. For example TBC 166, 136 may include a bond coat under a thermal barrier layer. In another non-limiting example not shown, TBC 166, 136 may include a bond coat layer; an intermediate layer positioned on the bond coat layer; and an outer or insulating layer positioned on the intermediate layer. In an example where TBC 166, 136 includes a bond coat layer (not shown), the bond coat layer may include: an aluminum rich material that includes a diffusion aluminide; MCrAlY where M is iron, cobalt, or nickel and Y is yttrium or another rare earth element; or any other suitable bond coat material. In an example where TBC includes an intermediate layer, the intermediate layer may include a yttria-stabilized zirconia or any other TBC intermediate layer material. In the example where TBC 166, 136 includes an outer or insulating layer, the insulating layer may include an ultra-low thermal conductivity ceramic material that includes, for example, a zirconium or hafnium base oxide lattice structure ($ZrO_2$ or $HfO_2$) and an oxide stabilizer compound (sometimes referred to as an oxide "dopant") that includes one or more of ytterbium oxide ($Yb_2O_3$), yttrium oxide/yttria ($Y_2O_3$), hafnium oxide ($HfO_2$), lanthanum oxide ($La_2O_3$), tantalum oxide ($Ta_2O_5$), and zirconium oxide ($ZrO_2$), or any other desirable TBC insulating material.

TBC 166, 136 may be formed on exterior faces 168, 146, 142 by deposition and/or any other now known or later developed process for forming a TBC on a surface. TBC 166 may be formed on an exterior face 168 of exterior wall 126 after airfoil 100 has been completed. Second TBC 136 may be formed on exterior face 146 of intermediate wall 128 before exterior wall 126 and intermediate wall 128 are combined. In another non-limiting example, TBC 166 may be formed on exterior face 168 before the formation of cooling passages 174 within exterior wall 126. Similarly, in another non-limiting example, second TBC 136 may be formed on exterior face 146 before the formation of impingement openings 186 and/or chamfers 190 within intermediate wall 128.

As best shown in FIG. 4 and as will be discussed in greater detail herein, spaced walls 122 of wall structure 120 may each include a plurality of openings therein to direct cooling medium 124 to flow from a central chamber 172 of airfoil 100 through wall structure 120 to exterior surface 170 of TBC 166. For example, during operation, cooling medium 124 may be directed to flow from central chamber 172 along paths A, B, and/or C. Cooling medium 124 may cool airfoil 100 during exposure to high temperature working fluid 116. For example, cooling medium 124 flowing through wall structure 120 may absorb heat from wall structure 120, TBC 166, 136 and/or other portions of airfoil 100.

Turning first to exterior wall 126, a plurality of cooling passages 174 may be included therein. Cooling passages 174 may allow for cooling medium 124 to exit wall structure 120 to cool TBC 166 as it is exposed to high temperature working fluid 116. For example, cooling medium 124 may flow along path C from one or more of plurality of first cooling chambers 154a to exterior surface 170 of TBC 166. Cooling passages 174 may have any size, shape, or configuration, e.g., selected based on the characteristics of a particular turbomachine and/or flow path where the turbomachine is employed. Any number of cooling passages 174 may be used herein. Cooling passages 174 may extend to exterior face 168 of exterior wall 126 and/or exterior surface 170 of TBC 166 in an orthogonal or non-orthogonal manner.

As shown in FIG. 3 and FIG. 4, exterior wall 126 may optionally include a plurality of plateaus 178 or raised features disposed on exterior face 168 of exterior wall 126. Plateaus 178 may provide additional thickness to portions of exterior wall 126. The presence of plateaus 178 may allow the length of cooling passages 174 to be increased, and thus may improve the flow of cooling medium 124 therethrough. One or more cooling passages 174 may extend through plateaus 178 to an outermost surface 180 thereof. In various embodiments, in the setting shown in FIG. 4, each plateau 178 may have a width W of approximately 0.1 inch to 1.5 inches and a height H of approximately 0.04 inch to approximately 0.15 inch. Although a particular number of plateau(s) 178 are shown in the example of FIG. 3 and FIG. 4, it is understood that any number of plateaus may be included on exterior face 168 of exterior wall 126. As further shown in FIG. 4, in the example wherein exterior wall 126 includes plateaus 178 disposed thereon, TBC 166 may have a thickness that is less than or equal to a height of plateaus 178. For example, as shown in both FIG. 3 and FIG. 4, the outermost surface 180 of plateaus 178 may remain free of TBC 166. Although surface 180 is shown in FIG. 3 to have a square geometry, it is understood that surface 180 may have any desirable shape, e.g., circular, diamond, rectangular, ovular, etc.

Turning next to intermediate wall 128 and interior wall 130 of spaced walls 122, each wall may include a plurality of impingement openings 186. Impingement openings 186 may direct the flow of cooling medium 124 to enter and pass through cooling chambers 154 of wall structure 120 from central chamber 172 of airfoil 100. For example, as shown in FIG. 4, intermediate wall 128 may include a first plurality of impingement openings 186a formed therein. During operation, cooling medium 124 may be directed to flow along path A from central chamber 172 through the second plurality of impingement openings 186*b* into one or more cooling chambers of the plurality of second cooling chambers 154*b*. Interior wall 130 may include a second plurality of impingement openings 186*b* formed therein. During operation, cooling medium 124 may also be directed to flow along path B from one or more cooling chambers of the plurality of second cooling chambers 154*b*, through first plurality of impingement openings 186*a*, and to one or more cooling chambers of the plurality of first cooling chambers 154*a*. As shown in FIG. 4, cooling medium 124 flowing along path B may contact interior face 148, absorbing heat therefrom and cooling exterior wall 126.

Impingement openings 186 may have any size, shape, or configuration, e.g., selected based on the characteristics of a particular turbomachine in which airfoil 100 may be employed and/or flow path where the turbomachine is employed. For example, each impingement opening 186 may have a diameter of approximately 0.012 inches to approximately 0.10 inches and may be spaced from one another by the equivalent of approximately 3 to approximately 12 diameters of the openings. As discussed above, in one example, with respect to standoff members 140, each spaced wall 122 may be separated a distance of approximately one-half to 5 times a diameter of the impingement openings which may reduce the amount of cooling medium 124 exiting the impingement openings which may become stagnant in the cooling chambers during operation. Any number of impingement openings 186 may be used herein. Impingement openings 186 may extend to an exterior face 142, 146 of interior wall 130 and/or intermediate wall 128, respectively, in an orthogonal or non-orthogonal manner. The position of first plurality of impingement openings 186*a* with respect an adjacent set of impingement openings (e.g., second plurality of impingement openings 186*b*) may be varied based on the desired flow of cooling medium 124 through wall structure 120. For example, the relative location of impingement openings in adjacent spaced walls 122 may be adjusted to change the flow profile, turbulence, etc. of cooling medium 124 within wall structure 120. As shown in the example of FIG. 4, first plurality of impingement openings 186*a* may not be aligned with second plurality of impingement openings 186*b*. Forming impingement openings in adjacent spaced walls 122 to not be aligned may, for example, direct cooling medium 124 along a longer or non-linear path which may allow the cooling medium to absorb more heat from wall structure 120. Although not shown, in another non-limiting example, some or all of the openings of the first plurality of impingement openings 186*a* may be substantially aligned with second plurality of impingement openings 186*b*.

Figure 12:
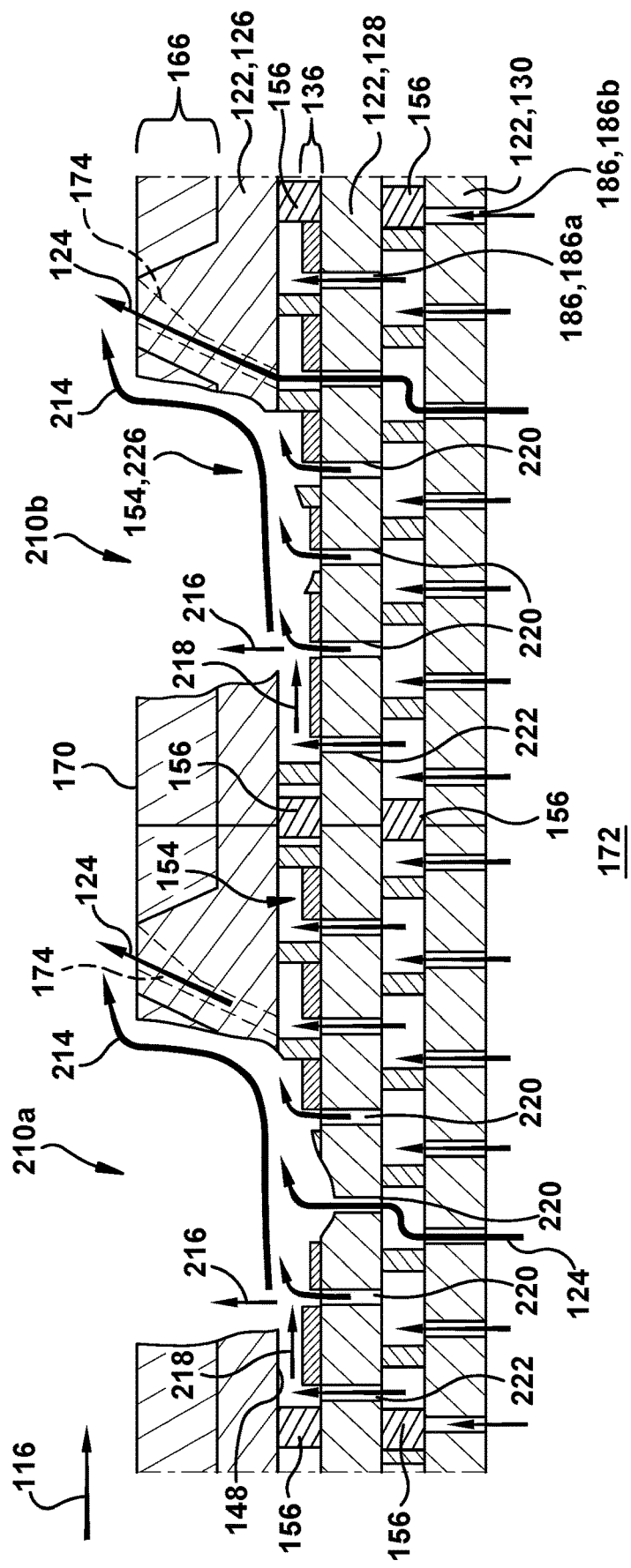
FIG. 12 is a cross-sectional view of a portion of the wall structure of the turbine airfoil with multiple walls including spall induced openings in the exterior wall of the airfoil, according to embodiments of the disclosure.

As further shown in FIG. 4, intermediate wall 128 and/or interior wall 130 may optionally include a diffuser portion or chamfer 190 (hereinafter referred to as chamfer(s) 190) at an interface 192 between an impingement opening 186 and a face of the wall. For example, intermediate wall 128 may include a chamfer 190 at interface 192 between sidewall 196 of impingement opening 186*a* and exterior face 146 of the intermediate wall. Chamfer 190 may direct cooling medium 124 to flow more freely between chambers 152*a*, 152*b*, and central chamber 172. For example, in a situation where a breach occurs in a portion of wall structure 120 exposing a wall and impingement openings 186 therein (e.g., intermediate wall 128 and exposed impingement openings 220 as shown in FIG. 12), a chamfer on the downstream side of the exposed impingement opening(s), relative to the gas path flow direction (e.g., working fluid 116), may force cooling medium 124 to flow along the exposed face of the exposed wall of wall structure 120 instead of blowing off of that face. The chamfers may, for example, improve the flow of cooling medium 124. Although two chamfers 190 are shown, it is understood that intermediate wall 128 and/or interior wall 130 may include any number, size, shape, and/or configuration of chamfers 190. Chamfers 190 may be formed, for example, during the formation of impingement openings 186*a*, 186*b* in intermediate wall 128 and interior wall 130, respectively. For example, where wall structure 120 is additively manufactured, chamfers 190 may be formed by not depositing and sintering material at the desired location of the chamfers during the additive manufacturing process. In another non-limiting example, chamfers 190 may be formed during the exposure of wall structure 120 to working fluid 116 in the event of TBC spall. For example, although not shown, intermediate wall 128 and/or interior wall 130 may be formed to include a material at interface 192 that is configured to break down during exposure to cooling medium 124 and/or working fluid 116 to form chamfers 190. For example, the material may be designed to physically break down (e.g., melt) as a result of exposure to one or both of cooling medium 124 and working fluid 116. The material may break down upon immediate exposure or over a time period of continuous exposure. Additionally, the material may be configured to partially or completely breakdown. In the example where chamfers 190 are formed during exposure to working fluid 116, chamfers 190 may be formed along with impingement openings 186, and subsequently filled during the additive manufacturing process with a material having thermal characteristics designed to break down and expose the chamfer at a predetermined temperature (e.g., approximately 980 degrees Celsius (° C.) to approximately 1150° C.). For example, the material used to fill the chamfers may have a lower melting point than the material used to form the remainder of intermediate wall 128 and/or interior wall 130. The material may include, for example, nickel, cobalt or chromium-based alloys as are known in the art.

Additionally, second TBC 136 may be disposed on exterior face 146 of intermediate wall 128 as shown in FIG. 4. It should be understood that third TBC 136*b* (in phantom) may also be similarly disposed on exterior face 142 of interior wall 130. Locations on exterior face 146 where partitions 156 or standoff members 140 contact exterior face 146 may remain free of second TBC 136. Impingement openings 186 and chamfers 190 may also remain free of second TBC 136. In embodiments including a material at interface 192 that is configured to break down during exposure to cooling medium 124 and/or working fluid 116 to form chamfers 190 (as described above) interface 192 remains free of second TBC 136.

The structure of wall structure 120 discussed herein may allow for improved cooling of all or part of airfoil 100 as compared to conventional airfoil designs. As shown in FIG. 4, during operation, cooling medium 124 may travel along paths A, B, and C to cool exterior wall 126 having TBC 166 positioned on the exterior face thereof and/or intermediate wall 128 having TBC 136 positioned on the exterior face thereof. The plurality of spaced walls 122 of wall structure 120 may increase the surface area of the wall and increase the surface area in contact with cooling medium 124 flowing through chambers 152 along paths A, B, and C. The structure of wall structure 120 may also allow for the thickness of each spaced wall 122 to be reduced while maintaining the structural integrity of the wall. Reducing the thickness of the walls 122 and increasing the surface area of wall structure 120 in contact with cooling medium 124 may reduce the temperature gradient across wall structure 120 and increase the amount of heat cooling medium 124 is able to absorb from airfoil 100. Standoff members 140 separating spaced walls 122 of wall structure 120 may also help conduct heat through wall structure 120 and direct desirable flow of cooling medium 124 through wall structure 120.

In operation, the structure of wall structure 120 and improved cooling provided thereby may increase the lifetime of an airfoil (e.g., airfoil 100) including a TBC (e.g., TBC 166) thereon. For example, as will be discussed further herein with respect to FIG. 11, the structure of wall structure 120 may mitigate oxidation of exterior wall 126 of the wall in a situation where a spall occurs in TBC 166 exposing a portion of the exterior wall. Further, second TBC 136 may mitigate oxidation and other damage to portions of intermediate wall 128 or interior wall 130 exposed by openings in exterior wall 126. Additionally, as will be discussed further herein with respect to FIG. 12, the structure of wall structure 120 may include one or more spalls and/or spall induced openings after operation over an extended time. Wall structure 120 may account for the eventual forming of spalls and/or spall induced openings by rerouting the flow of cooling medium 124 through the spall induced openings as a cooling slot film 214 (FIG. 12). The rerouted cooling medium 124 may also contact working fluid 116 to prevent and/or mitigate the amount of working fluid 116 entering airfoil 100 through the spall induced opening(s).

Figure 11:
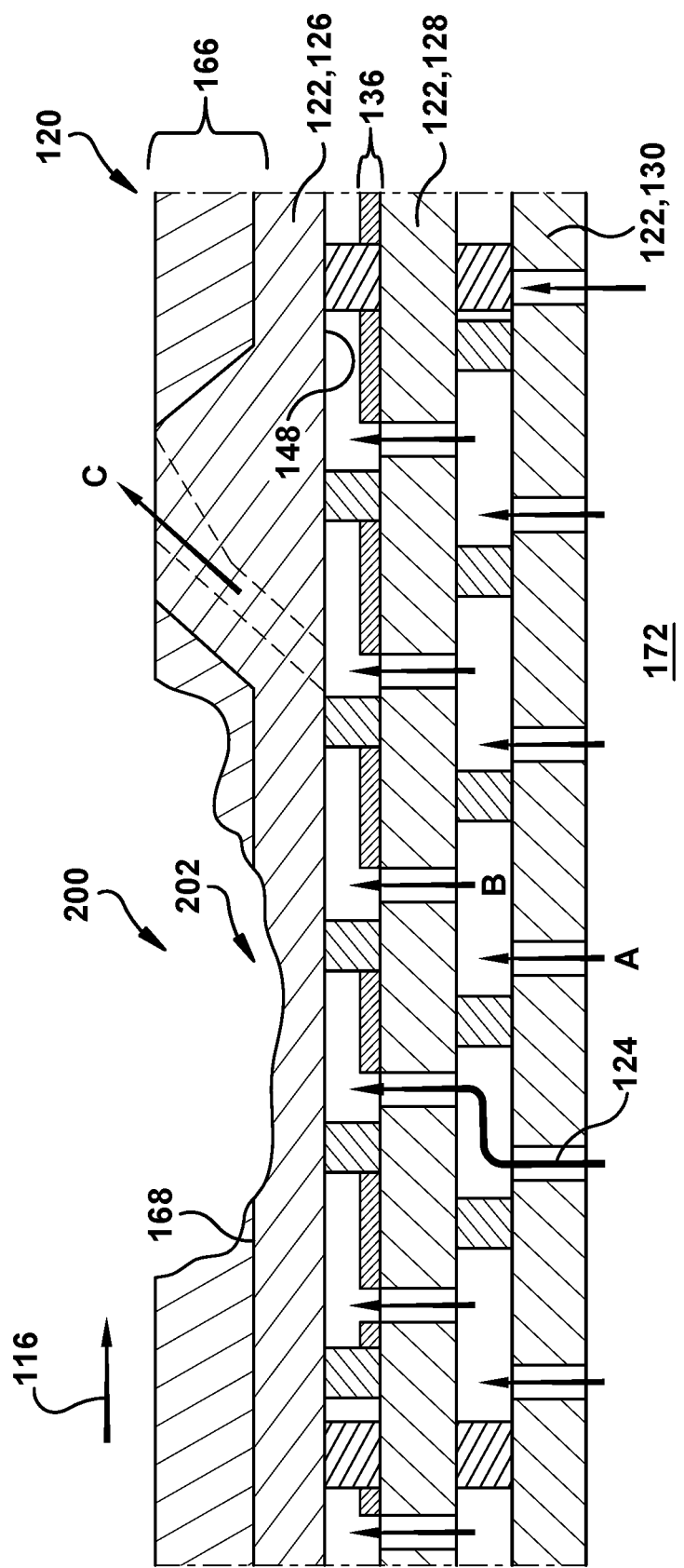
FIG. 11 is a cross-sectional view of a portion of the wall structure of the turbine airfoil with multiple walls including a TBC spall over the exterior wall of the turbine airfoil, according to embodiments of the disclosure.

FIG. 11 shows a cross-sectional view of a portion of wall structure 120 of airfoil 100 including a spall 200 in TBC 166. Spall 200 may include any change in TBC 166 creating a thermal path to exterior face 168 of exterior wall 126 for working fluid 116 which was not previously present. For example, spall 200 may include a break or crack in, or displacement of TBC 166 creating a thermal path to exterior face 168 of exterior wall 126. When spall 200 occurs, a portion 202 of exterior face 168 of exterior wall 126 of airfoil 100 (FIG. 3) is exposed to the high temperatures and other extreme environments of working fluid 116, where prior to spall 200 occurring, portion 202 of exterior face 168 was protected by TBC 166. After spall 200 occurs during operation, cooling medium 124 flowing through wall structure 120 along paths A, B, and C continues to contact each of spaced walls 122 of wall structure 120, including interior face 148 of exterior wall 126. As discussed above, wall structure 120 having plurality of spaced walls 122 may allow for a reduction in the thickness of the walls and increase the surface area cooling medium 124 may contact. Cooling medium 124 may therefore contact and absorb heat from each of the spaced walls 122, and reduce the temperature of wall structure 120, including the portions below portion 202 exposed to working fluid 116. Additionally, cooling fluid contacting interior face 148 of exterior wall 126 may substantially cool the entire thickness T1 of the thin exterior wall through to exterior face 168 directly exposed to working fluid 116.

Turning next to FIG. 12, a cross-sectional view of a portion of airfoil 100 including spall induced openings 210a, 210b in exterior wall 126 is shown. Spalls in TBC 166 such as spall 200 as shown in FIG. 11 may cause spall induced opening 210a or 210b to occur in exterior wall 126 of wall structure 120. For example, portion 202 of exterior face 168 as shown in FIG. 11 may eventually oxidize during the exposure to high temperature working fluid 116, forming spall induced opening 210a or 210b. When spall induced openings 210a, 210b occur during operation, cooling medium 124 normally exits airfoil 100 through the openings in a direction perpendicular to exterior surface 170 of TBC 166. In contrast, as shown in FIG. 12, the structure of wall structure 120 may allow for a cooling slot film 214 to be formed over the surfaces exposed by spall induced openings 210, e.g., portions of exterior wall 126 and intermediate wall 128. The structure of wall structure 120 may therefore increase the lifetime of an airfoil having a TBC such as TBC 166, 136. For example, cooling slot film 214 may protect the exposed portions of wall structure 120 from the high temperature of working fluid 116, and mitigate the oxidation of the exposed walls. As also shown in FIG. 12, portions of intermediate wall 128 exposed by spall induced openings 210a, 210b in exterior wall 126 may receive additional protection from contact with working fluid 116 due to second TBC 136 disposed on exterior face 146.

As shown in FIG. 12, wall structure 120 may be configured to form adaptive cooling flows 216 and 218 in response to spall induced openings 210a, 210b. Adaptive cooling flows 216 and 218 may contact one another to form cooling slot film 214. As shown in FIG. 12, upon exposure of intermediate wall 128 including impingement openings 186a therein, an increased exit area causes a pressure gradient change across wall structure 120 which may in turn draw a first adaptive cooling flow 216 to exposed portion 220 of impingement openings 186a at the spall induced opening(s). For example, the surface area of the plurality of spaced walls 122 at spall induced opening 210 may direct an increased backside flow of cooling medium 124 from central chamber 172 toward exposed portion 220 of impingement openings 186a to form first adaptive cooling flow 216. First adaptive cooling flow 216 may exit the exposed portion of impingement openings 186a of intermediate wall 128 in a direction perpendicular to exterior face 146 of intermediate wall 128. As also shown in FIG. 12, in response to spall induced openings 210, a second adaptive cooling flow 218 may exit an upstream portion 222 of impingement openings 186a adjacent to exposed portion 220 of impingement openings 186a at the spall induced openings. Similarly to the flow of cooling medium 124 prior to the spall induced opening, second adaptive cooling flow 218 may travel through first chamber 152a and contact interior face 148 of exterior wall 126. Cooling fluid flow may therefore exit the chamber at spall induced openings 210a, 210b in a direction parallel to interior face 148 of exterior wall 126. As further shown in FIG. 12, second adaptive cooling flow 218 may contact first adaptive cooling flow 216 in the spall induced opening, directing first adaptive cooling flow 216 in the direction parallel to interior face 148. Second adaptive cooling flow 218 contacting first adaptive cooling flow 216 may form cooling slot film 214 over the portions of wall structure 120 exposed by spall induced openings 210. Second adaptive cooling flow 218 and/or first adaptive cooling flow 216 may also contact working fluid 116 at spall induced opening(s) 210, directing the working fluid away from exposed intermediate wall 128 and preventing and/or mitigating the amount of working fluid entering airfoil 100 through spall induced openings(s) 210.

Although shown in a particular portion of wall structure 120, it is understood that spall induced openings 210 may occur at any location within wall structure 120 and may still be mitigated by the structure of wall structure 120 disclosed herein. Additionally, although slot induced openings 210 are shown to extend only through exterior wall 126 of wall structure 120, it is understood that spall induced openings 210 may extend further through intermediate wall 128 and/or interior wall 130 and may similarly be mitigated by the structure of wall structure 120.

As further shown in FIG. 12, partitions 156 may prevent working fluid 116 from entering, and/or cooling medium 124 from re-entering, airfoil 100 through portions of wall structure 120 exposed by spall induced openings 210. For example, partition 156 may form a pressure differential to block working fluid 116 from entering, and/or cooling medium 124 from re-entering, a downstream portion 226 of first and/or second chamber(s) 152. Partitions 156 may also block the portion of cooling medium 124 exiting from upstream spall induced opening 210a from re-entering first and/or second chamber(s) 152 at a neighboring, downstream spall induced opening 210b and/or cooling passage(s) 174.

Figure 13:
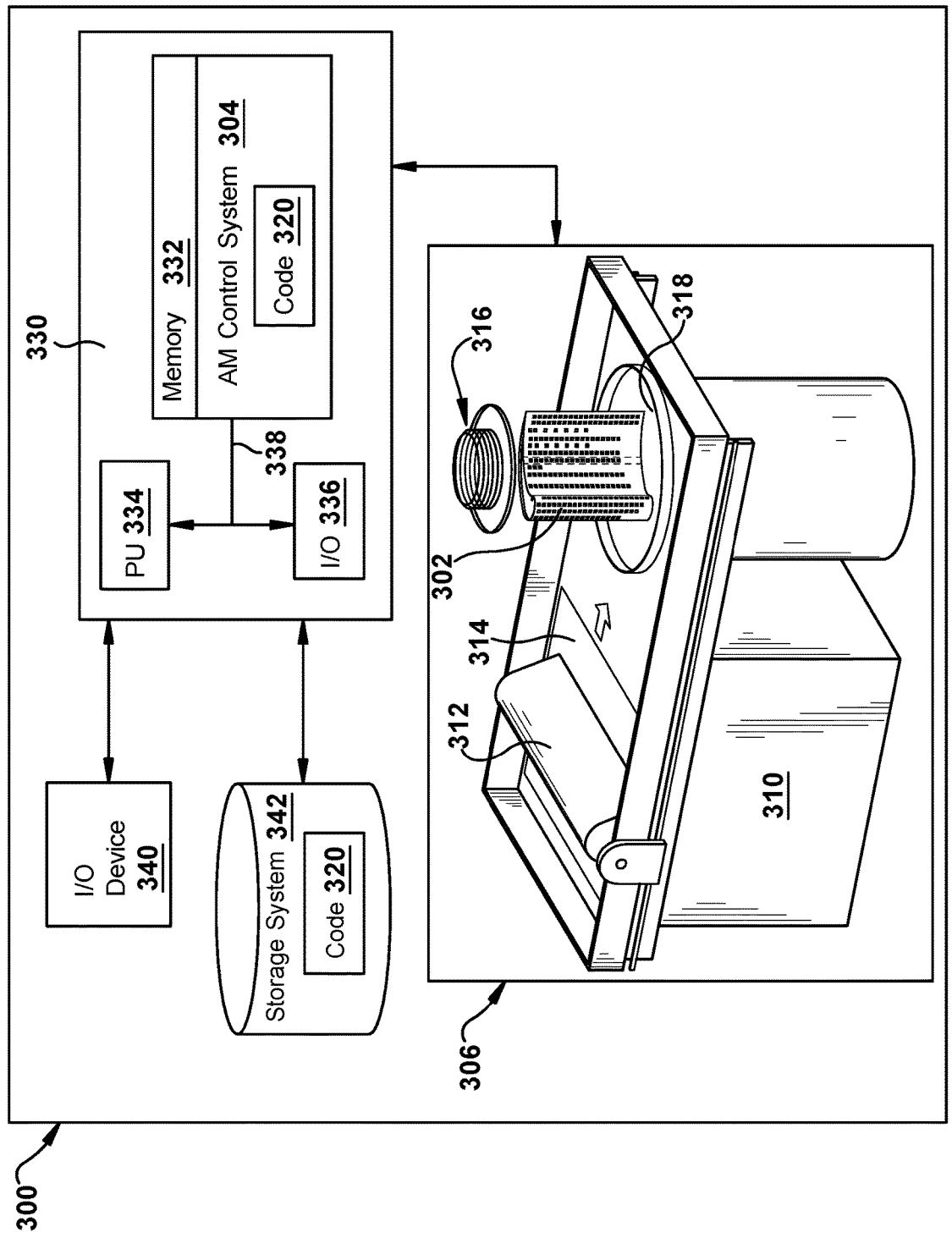
FIG. 13 is a block diagram of an additive manufacturing process including a non-transitory computer readable storage medium storing code representative of a hot gas path component in the form of a turbine airfoil, according to embodiments of the disclosure.

Referring to FIG. 13, in accordance with embodiments of the disclosure, the HGP component in the form of airfoil 100 and wall structure 120 thereof may be additively manufactured such that various structures of wall structure 120 are formed as integral components. Additive manufacturing also allows for easy formation of much of the structure described herein, i.e., without very complex machining. As used herein, additive manufacturing (AM) may include any process of producing an object through the successive layering of material rather than the removal of material, which is the case with conventional processes. Additive manufacturing can create complex geometries without the use of any sort of tools, molds or fixtures, and with little or no waste material. Instead of machining components from solid billets of plastic or metal, much of which is cut away and discarded, the only material used in additive manufacturing is what is required to shape the part. Additive manufacturing processes may include but are not limited to: 3D printing, rapid prototyping (RP), direct digital manufacturing (DDM), binder jetting, selective laser melting (SLM) and direct metal laser melting (DMLM).

To illustrate an example of an additive manufacturing process, FIG. 13 shows a schematic/block view of an illustrative computerized additive manufacturing system 300 for generating an object 302, e.g., exterior wall 126. In this example, system 300 is arranged for DMLM. It is understood that the general teachings of the disclosure are equally applicable to other forms of additive manufacturing. AM system 300 generally includes a computerized additive manufacturing (AM) control system 304 and an AM printer 306. AM system 300, as will be described, executes code 320 that includes a set of computer-executable instructions defining portions of wall structure 120 (FIG. 4) including the structures thereof (e.g., exterior wall 126, spaced walls 128, 130, standoff members 140a, 140b, impingement openings 186a, 186b, etc.), to physically generate the component using AM printer 306. Each AM process may use different raw materials in the form of, for example, fine-grain powder, liquid (e.g., polymers), sheet, etc., a stock of which may be held in a chamber 310 of AM printer 306. In the instant case, airfoil 100 (FIG. 3 and FIG. 4) may be made of metal powder or similar materials. As illustrated, an applicator 312 may create a thin layer of raw material 314 spread out as the blank canvas from which each successive slice of the final object will be created. In other cases, applicator 312 may directly apply or print the next layer onto a previous layer as defined by code 320, e.g., where the material is a polymer or where a metal binder jetting process is used. In the example shown, a laser or electron beam 316 fuses particles for each slice, as defined by code 320, but this may not be necessary where a quick setting liquid plastic/polymer is employed. Various parts of AM printer 306 may move to accommodate the addition of each new layer, e.g., a build platform 318 may lower and/or chamber 310 and/or applicator 312 may rise after each layer.

AM control system 304 is shown implemented on computer 330 as computer program code. To this extent, computer 330 is shown including a memory 332, a processor 334, an input/output (I/O) interface 336, and a bus 338. Further, computer 330 is shown in communication with an external I/O device 340 and a storage system 342. In general, processor 334 executes computer program code, such as AM control system 304, that is stored in memory 332 and/or storage system 342 under instructions from code 320 representative of components of airfoil 100 (FIG. 3 and FIG. 4), described herein. While executing computer program code, processor 334 can read and/or write data to/from memory 332, storage system 342, I/O device 340 and/or AM printer 306. Bus 338 provides a communication link between each of the components in computer 330, and I/O device 340 can comprise any device that enables a user to interact with computer 330 (e.g., keyboard, pointing device, display, etc.). Computer 330 is only representative of various possible combinations of hardware and software. For example, processor 334 may comprise a single processing unit, or be distributed across one or more processing units in one or more locations, e.g., on a client and server. Similarly, memory 332 and/or storage system 342 may reside at one or more physical locations. Memory 332 and/or storage system 342 can comprise any combination of various types of non-transitory computer readable storage medium including magnetic media, optical media, random access memory (RAM), read only memory (ROM), etc. Computer 330 can comprise any type of computing device such as a network server, a desktop computer, a laptop, a handheld device, a mobile phone, a pager, a personal data assistant, etc.

Additive manufacturing processes begin with a non-transitory computer readable storage medium (e.g., memory 332, storage system 342, etc.) storing code 320 representative of components of airfoil 100 (FIG. 3 and FIG. 4). As noted, code 320 includes a set of computer-executable instructions defining object 302 that can be used to physically generate the object, upon execution of the code by system 300. For example, code 320 may include a precisely defined 3D model of components of airfoil 100 (FIG. 3 and FIG. 4) and can be generated from any of a large variety of well-known computer aided design (CAD) software systems such as AutoCAD®, TurboCAD®, DesignCAD 3D Max, etc. In this regard, code 320 can take any now known or later developed file format. For example, code 320 may be in the Standard Tessellation Language (STL) which was created for stereolithography CAD programs of 3D Systems, or an additive manufacturing file (AMF), which is an American Society of Mechanical Engineers (ASME) standard that is an extensible markup-language (XML) based format designed to allow any CAD software to describe the shape and composition of any three-dimensional object to be fabricated on any AM printer. Code 320 may be translated between different formats, converted into a set of data signals and transmitted, received as a set of data signals and converted to code, stored, etc., as necessary. Code 320 may be an input to system 300 and may come from a part designer, an intellectual property (IP) provider, a design company, the operator or owner of system 300, or from other sources. In any event, AM control system 304 executes code 320, airfoil 100 (FIG. 3 and FIG. 4) into a series of thin slices that it assembles using AM printer 306 in successive layers of liquid, powder, sheet or other material. In the DMLM example, each layer is melted to the exact geometry defined by code 320 and fused to the preceding layer.

Embodiments that include second TBC 136 on exterior faces 146 and/or 142 of spaced walls 122 other than exterior wall 126 may be additively manufactured as separate components and later assembled to form wall structure 120. For example, interior wall 130 and intermediate wall 128 together may be additively manufactured as a separate component (e.g., airfoil core) from exterior wall 126 (e.g., airfoil skin). Subsequent to application of second TBC 136, interior wall 130 and intermediate wall 128 may be assembled to exterior wall 126. Assembly of wall structure 120 may be accomplished by metallurgical means (e.g., brazing or welding) or mechanical means (e.g., friction fit or fasteners) or any combination thereof.

Subsequent to additive manufacture, components of airfoil 100 (FIG. 3 and FIG. 4) may be exposed to any variety of finishing processes, e.g., minor machining, sealing, polishing, assembly to another part, etc. In terms of the present disclosure, TBC 166, 136 may be applied to some or all of exterior faces 168, 146, 142 of spaced walls 122 of wall structure 120. TBC 166, 136 may be applied using any now known or later developed coating techniques, and may be applied in any number of layers. Second TBC 136 may be either present or absent on lateral sidewalls of standoff members 140 and/or partitions 156. In some embodiments, second TBC 136 may be absent from outer surfaces and/or inner surfaces of standoff members 140 to facilitate conduction of heat through wall structure 120. Similarly, second TBC 136 may be absent from outer surfaces and/or inner surfaces of partitions 156. TBC 166, 136 may be selectively applied to exterior faces 168, 146, 142, standoff members 140, and partitions 156 so as to leave portions free of TBC 166, 136 as described above. Alternatively, TBC 166, 136 may be selectively removed after application, or TBC 166, 136 may be formed by a combination of selective application and selective removal steps.

In operation, as shown in FIG. 11, following the occurrence of spall 200 in TBC 166 over exterior wall 126 the structure of wall structure 120 allows cooling medium 124 to pass therethrough, extending the lifetime of the wall structure and airfoil. Also in operation, as shown in FIG. 12, following the occurrence of spall induced opening(s) 210 in TBC 166 over exterior wall 126 the structure of wall structure 120 allow for cooling slot film 214 to be formed from cooling medium 124 over portions of wall structure 120 exposed by the spall induced openings.

Airfoil 100 according to embodiments of the disclosure provides a wall structure 120 that cools and increases the lifespan of the 100 in response to a spall 200. The structure of wall structure 120 may significantly reduce nominal cooling flows. Use of additive manufacturing for airfoil 100 allows for wall structure 120 of airfoil 100 to be formed to include a multi-layer, multi-wall, multi-material (e.g., in the case of diffuser portion or chamfer 190), and/or multi-cooling chamber structure.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. "Optional" or "optionally" means that the subsequently described event or circumstance may or may not occur, and that the description includes instances where the event occurs and instances where it does not.

Approximating language, as used herein throughout the specification and claims, may be applied to modify any quantitative representation that could permissibly vary without resulting in a change in the basic function to which it is related. Accordingly, a value modified by a term or terms, such as "about," "approximately" and "substantially," are not to be limited to the precise value specified. In at least some instances, the approximating language may correspond to the precision of an instrument for measuring the value. Here and throughout the specification and claims, range limitations may be combined and/or interchanged, such ranges are identified and include all the sub-ranges contained therein unless context or language indicates otherwise. "Approximately" as applied to a particular value of a range applies to both values, and unless otherwise dependent on the precision of the instrument measuring the value, may indicate +/−10% of the stated value(s).

The corresponding structures, materials, acts, and equivalents of all means or step plus function elements in the claims below are intended to include any structure, material, or act for performing the function in combination with other claimed elements as specifically claimed. The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The embodiment was chosen and described in order to best explain the principles of the disclosure and the practical application, and to enable others of ordinary skill in the art to understand the disclosure for various embodiments with various modifications as are suited to the particular use contemplated.

What is claimed is:

1. A turbine airfoil, the turbine airfoil having a wall structure comprising:
a plurality of spaced walls including an exterior wall, an intermediate wall, and an interior wall, wherein each of the plurality of spaced walls are separated from an adjacent spaced wall by a plurality of standoff members;
a plurality of outer cooling chambers defined between the exterior wall and the intermediate wall;
an outer partition between the exterior wall and the intermediate wall that axially separates each of the plurality of outer cooling chambers from one another;
a plurality of intermediate cooling chambers defined between the intermediate wall and the interior wall;
an intermediate partition between the intermediate wall and the interior wall that axially separates each of the plurality of intermediate cooling chambers from one another;
a first thermal barrier coating (TBC) disposed on an exterior face of the exterior wall, the first TBC having an exterior surface configured to be exposed to a working fluid having a high temperature;
a second TBC disposed on an outer face of the intermediate wall, the second TBC having an outer surface configured to be exposed to the working fluid having the high temperature;
a first plurality of impingement openings through the interior wall, the first plurality of impingement openings providing passageways for a coolant from a central chamber of the turbine airfoil to at least one of the plurality of intermediate cooling chambers;
a second plurality of impingement openings through the intermediate wall, the second plurality of impingement openings providing passageways for the coolant from at least one of the plurality of intermediate cooling chambers to at least one of the plurality of outer cooling chambers; and a plurality of cooling passages through the exterior wall, the plurality of cooling passages providing passageways for the coolant from at least one of the plurality of outer cooling chambers to the exterior surface of the first TBC.

2. The turbine airfoil of claim 1, wherein the outer partition extends from an exterior face of the intermediate wall to an interior face of the exterior wall along a radial length of the intermediate wall.

3. The turbine airfoil of claim 1, wherein the intermediate partition extends from an exterior face of the interior wall to an interior face of the intermediate wall along a radial length of the intermediate wall.

4. The turbine airfoil of claim 1, wherein the outer partition and the intermediate partition are aligned along the same radial length of the intermediate wall.

5. The turbine airfoil of claim 1, further comprising a plurality of plateaus disposed on the exterior face of the exterior wall,
wherein each cooling passage in the plurality of cooling passages is disposed to pass through a respective plateau of the plurality of plateaus, and
wherein an outer surface of each plateau in the plurality of plateaus is free from the first TBC.

6. The turbine airfoil of claim 1, wherein a thickness of the exterior wall is substantially equal to a thickness of at least one of the intermediate wall and the interior wall.

7. The turbine airfoil of claim 6, wherein the thickness of the exterior wall is approximately 0.02 inches to approximately 0.15 inches.

8. The turbine airfoil of claim 1, wherein the intermediate wall includes a chamfer at an interface between an outer face of the intermediate wall and a sidewall of an impingement opening of the second plurality of impingement openings.

9. The turbine airfoil of claim 1, wherein the first plurality of impingement openings are not aligned with the second plurality of impingement openings.

10. The turbine airfoil of claim 1, wherein a cross-sectional geometry of each standoff member in the plurality of standoff members is selected from the group consisting of circular, oblong, figure-eight, square, square with curved sides, and rectangular geometry.

11. A hot gas path (HGP) component, the HGP component having a wall structure comprising:
a plurality of spaced walls including an exterior wall, an intermediate wall, and an interior wall, wherein each of the plurality of spaced walls are separated from an adjacent spaced wall by a plurality of standoff members;
a plurality of outer cooling chambers defined between the exterior wall and the intermediate wall;
an outer partition between the exterior wall and the intermediate wall that axially separates each of the plurality of outer cooling chambers from one another;
a plurality of intermediate cooling chambers defined between the intermediate wall and the interior wall;
an intermediate partition between the intermediate wall and the interior wall that axially separates each of the plurality of intermediate cooling chambers from one another;
a first thermal barrier coating (TBC) disposed on an exterior face of the exterior wall, the first TBC having an exterior surface configured to be exposed to a working fluid having a high temperature;
a second TBC disposed on an outer face of the intermediate wall, the second TBC having an outer surface configured to be exposed to the working fluid having the high temperature;
a first plurality of impingement openings through the interior wall, the first plurality of impingement openings providing passageways for a coolant from a central chamber of the HGP component to at least one of the plurality of intermediate cooling chambers;
a second plurality of impingement openings through the intermediate wall, the second plurality of impingement openings providing passageways for the coolant from at least one of the plurality of intermediate cooling chambers to at least one of the plurality of outer cooling chambers;
a plurality of plateaus disposed on the exterior face of the exterior wall, wherein an outer surface of each plateau in the plurality of plateaus is free from the first TBC; and
a plurality of cooling passages through the exterior wall, each cooling passage in the plurality of cooling passages disposed to pass through a respective plateau of the plurality of plateaus, and wherein the plurality of cooling passages provides passageways for the coolant from at least one of the plurality of outer cooling chambers to the exterior surface of the first TBC.

12. The HGP component of claim 11, wherein a thickness of the exterior wall is substantially equal to a thickness of at least one of the intermediate wall and the interior wall.

13. The HGP component of claim 12, wherein the thickness of the exterior wall is approximately 0.02 inches to approximately 0.15 inches.

14. The HGP component of claim 11, wherein in a situation where a spall induced opening in the first TBC and exterior wall exposes a portion of the intermediate plurality of impingement openings, the portion of the intermediate plurality of impingement openings is configured such that the coolant forms a cooling slot film over a portion of the exterior wall exposed by the spall induced opening.

15. A method of manufacturing a turbine airfoil, comprising:
additively manufacturing a turbine airfoil skin, the turbine airfoil skin including:
an exterior wall; and
a plurality of cooling passages through the exterior wall;
applying a first thermal barrier coating (TBC) on an exterior face of the exterior wall of the turbine airfoil skin, the first TBC having an exterior surface configured to be exposed to a working fluid having a high temperature;
additively manufacturing a turbine airfoil core, the turbine airfoil core including:
a plurality of spaced walls including an interior wall including a first plurality of impingement openings through the interior wall, and an intermediate wall having a second plurality of impingement openings through the intermediate wall, wherein each of the plurality of spaced walls are separated from an adjacent spaced wall by a first plurality of standoff members;
a plurality of intermediate cooling chambers defined between the interior wall and the intermediate wall;

an intermediate partition between the intermediate wall and the interior wall axially separating each of the plurality of intermediate cooling chambers from one another;

a second plurality of standoff members positioned on an outermost face of the turbine airfoil core; and an outer partition positioned on the outermost face of the turbine airfoil core;

applying a second TBC on the outermost face of the turbine airfoil core, the second TBC having an outer surface configured to be exposed to the working fluid having the high temperature; and assembling the turbine airfoil skin and the turbine airfoil core to form a turbine airfoil wall structure such that the turbine airfoil core is surrounded by the turbine airfoil skin, wherein:

the turbine airfoil skin is separated from the turbine airfoil core by the second plurality of standoff members, a plurality of outer cooling chambers is defined between the turbine airfoil skin and the turbine airfoil core, the outer partition axially separating each of the plurality of outer cooling chambers from one another;

the plurality of cooling passages provides passageways for coolant from at least one of the plurality of outer cooling chambers to the exterior surface of the first TBC;

the first plurality of impingement openings provides passageways for a coolant from a central chamber of the turbine airfoil to at least one of the plurality of intermediate cooling chambers; and the second plurality of impingement openings provides passageways for the coolant from at least one of the plurality of intermediate cooling chambers to at least one of the plurality of outer cooling chambers.

16. The method of claim 15, wherein in response to a spall induced opening being created in the exterior wall of the turbine airfoil, the coolant forms a cooling slot film over a portion of the exterior wall exposed by the spall induced opening.

17. The method of claim 16, wherein the cooling slot film is formed by a first adaptive coolant flow exiting a first portion of the second plurality of impingement openings exposed by the spall induced opening, and a second adaptive coolant flow exiting a second portion of the second plurality of impingement openings exposed by the spall induced opening, the second portion being adjacent to and upstream of the first portion, wherein the second adaptive fluid flow contacts the first adaptive fluid flow to direct the first adaptive fluid flow in a direction parallel to an interior face of the external wall.

18. The method of claim 16, wherein the outer partition prevents the working fluid from entering the spall induced opening, and wherein the outer partition prevents the cooling slot film from re-entering the spall induced opening.

19. The method of claim 15, wherein in response to a spall in the first TBC exposing a portion of the exterior face of the exterior wall, an adaptive cooling flow travels from the central chamber to an interior face of the exterior wall to substantially reduce the oxidation of the exterior wall.

20. The method of claim 15, wherein the intermediate wall includes a chamfer at an interface between an outer face of the intermediate wall and a sidewall of an impingement opening of the second plurality of impingement openings, and further comprising allowing the chamfer to direct the coolant substantially in parallel with the outer face of the intermediate wall.

\* \* \* \* \*